United States Patent
Finn et al.

[11] Patent Number: 6,142,381
[45] Date of Patent: Nov. 7, 2000

[54] CONTACT OR CONTACTLESS CHIP CARD WITH BRACE

[76] Inventors: David Finn, Steigmühlenweg 16a, 87629 Füssen-Weissensee; Manfred Rietzler, Am Alsterberg 10, 87616 Marktoberdorf, both of Germany

[21] Appl. No.: 09/155,002
[22] PCT Filed: Mar. 17, 1997
[86] PCT No.: PCT/DE97/00538
§ 371 Date: Sep. 14, 1998
§ 102(e) Date: Sep. 14, 1998
[87] PCT Pub. No.: WO97/35273
PCT Pub. Date: Sep. 25, 1997

[30] Foreign Application Priority Data

Mar. 15, 1996 [DE] Germany ............... 196 10 098
Mar. 18, 1996 [DE] Germany ............... 196 10 507

[51] Int. Cl.[7] .......................... G06K 19/06; G06K 7/00; G06K 7/06
[52] U.S. Cl. .................. 235/492; 235/441; 235/487
[58] Field of Search ................... 235/492, 441, 235/487; 257/679, 720, 737; 361/736, 737, 728; 705/41

[56] References Cited

U.S. PATENT DOCUMENTS

| | | | |
|---|---|---|---|
| 4,463,971 | 8/1984 | Hoppe et al. | 235/492 |
| 5,321,240 | 6/1994 | Takahiro | 235/492 |
| 5,420,757 | 5/1995 | Eberhardt et al. | 361/728 |
| 5,612,532 | 3/1997 | Iswasaki | 235/492 |
| 5,671,525 | 9/1997 | Fidalgo | 235/492 |
| 5,852,289 | 12/1998 | Masahiko | 235/492 |
| 5,962,840 | 10/1999 | Haghiri-Tehrani et al. | 361/737 |

FOREIGN PATENT DOCUMENTS

| | | |
|---|---|---|
| 0 671 705 A2 | 9/1995 | European Pat. Off. . |
| 39 24 439 A1 | 4/1991 | Germany . |
| 91 00 665 U1 | 8/1992 | Germany . |
| 43 02 387 A1 | 8/1993 | Germany . |
| 43 28 469 A1 | 3/1995 | Germany . |
| 44 03 753 C1 | 7/1995 | Germany . |
| 44 16 697 A1 | 11/1995 | Germany . |
| 44 31 754 C1 | 11/1995 | Germany . |
| 44 31 604 A1 | 3/1996 | Germany . |
| 2 096 541 | 10/1982 | United Kingdom . |
| 2 267 683 | 12/1993 | United Kingdom . |
| WO 91/01533 | 2/1991 | WIPO . |

*Primary Examiner*—Donald Hajec
*Assistant Examiner*—Larry D Taylor
*Attorney, Agent, or Firm*—McGlew and Tuttle, PC

[57] ABSTRACT

A chip card for contact access and contactless access to a chip arranged in a chip module, wherein the chip module is arranged in a recess (59) of a card body (49) such that outer contact surfaces (51) of the chip module are arranged at the surface (60) of the card body (49) and inner contact surfaces (53) of the chip module are connected to conductor ends (55, 56) of a coil (57) arranged in the card body to form a transponder unit, where the coil has the form of a wire coil (57) and the depth (t) of the recess (59) which accommodates the chip module is such that wire ends (55, 56) arranged in the region of the recess (59) have a contact flattening (63) formed by the machining process for the formation of the recess (59).

19 Claims, 4 Drawing Sheets

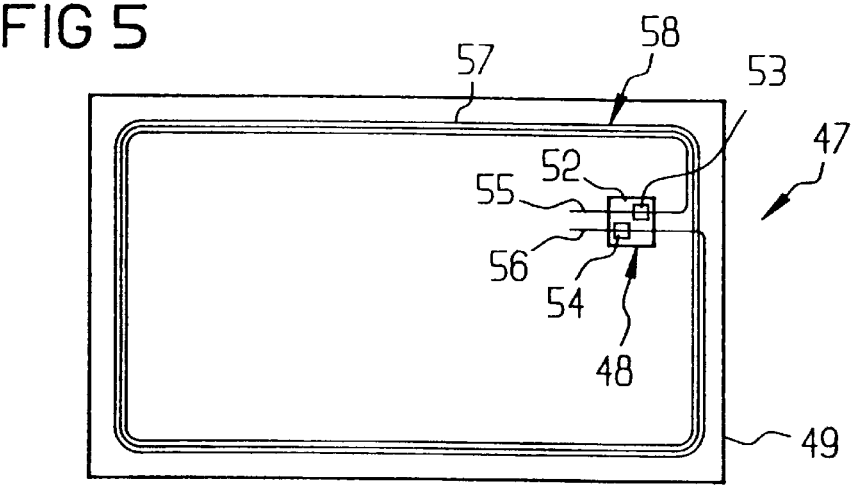
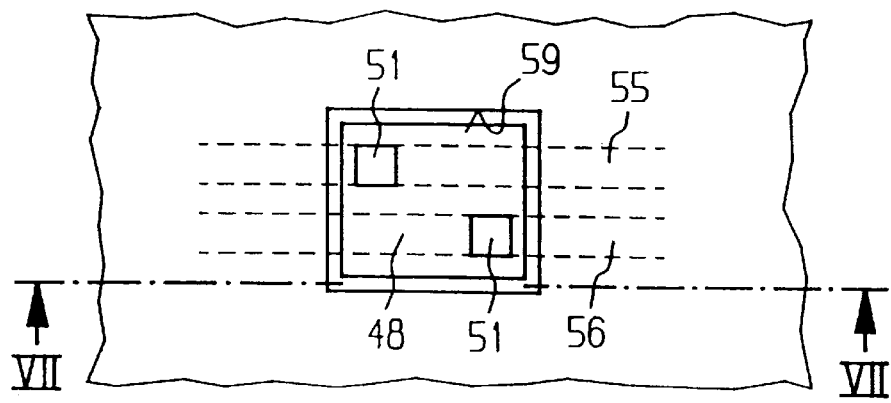
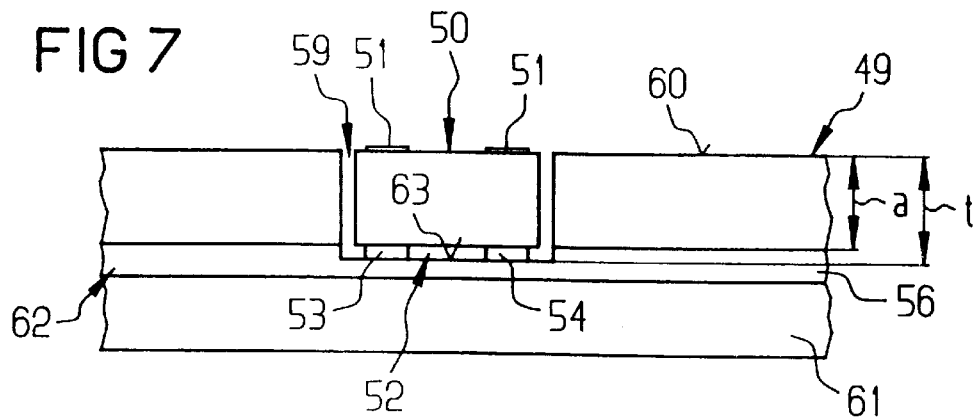

CONTACT OR CONTACTLESS CHIP CARD WITH BRACE

The present invention relates to a chip card in various embodiments. On the one hand the present invention relates to a chip card for contact access to a chip arranged in a chip module, the chip module being arranged in a recess of a card body such that contact surfaces of the chip module are arranged at the surface of the card body. Such chip cards are known for example as so-called "phone cards".

On the other hand the present invention relates to a chip card for contactless access to a chip or chip module, the chip or chip module being arranged together with a coil in a card body to form a transponder unit and conductor ends of the coil being contacted on connection surfaces of the chip or chip module. Such chip cards are known as so-called "transponder cards" used for example for personal identification.

The present invention further relates to a chip card for contact access and contactless access to a chip arranged in a chip module, the chip module being arranged in a recess of a card body such that outer contact surfaces of the chip module are arranged at the surface of the card body and inner contact surfaces of the chip module are connected to conductor ends of a coil arranged in the card body to form a transponder unit. Such chip cards are referred to as so-called "combicards" or also "hybrid cards" as on the one hand they allow direct contact access to the chip module and on the other hand allow contactless access to the chip module by means of the coil acting as antenna.

In all the above mentioned chip cards, irrespectively of the particular embodiment, the possibility of reliable contact access to the chip or chip module has proved essential to the functioning reliability of the chip card. In the case of chip cards of the type provided with a chip module and facilitating contact access to outwardly directed connection surfaces of the chip module, special measures are required to maintain the defined position of the chip module and thus also the positioning of the outer connection surfaces relative to the card body in spite of the changing bending stresses which frequently occur in chip cards. Here a particular problem consists in that, due to its arrangement in the card body at a distance from the so-called "neutral axis", in the event of a bending load the chip module is subjected to the maximum bending stress occurring in the surface region of the card body. The chip module is secured in a recess of the card body by adhesion.

To prevent delaminations in the region of the boundary surface between the adhesive and the card body, which could lead to the detachment of the chip module from the card body, it is known to arrange a metal ring on the chip module to provide a certain anchoring in the card body and thus to brace the card body in the region of the chip module.

Irrespectively of the particular form of the chip card, the object of the invention is to propose measures which improve the functioning reliability of the chip card with regard to the changing dynamic bending stresses which frequently occur in a chip card.

In the case of a chip card for contact access, this object is achieved by the features of claim 1.

In accordance with the invention, the card body is provided in the region of the recess with a laminated-in bracing device extending in the longitudinal direction of the card.

In contrast to the known bracing device outlined above, which forms an integral part of the chip module, the bracing device according to the invention is independent of the chip module and is integrated into the card body during its production before the recess accommodating the chip module is introduced into the card body. The arrangement of the bracing device in the card body, for example by laminating-in, results in improved anchoring in the card body. Additionally it is possible to use a standardized bracing device which need not be precisely adapted to the dimensions of the chip module, as is the case with the known ring-shaped bracing device integrally connected to the chip module.

In the event that the card body is produced by a method other than lamination, thus for example in the case of a card body produced by injection moulding, it is again possible to achieve the advantageous integrated arrangement of the bracing device in the card body by an appropriate arrangement of the bracing device in a mould. Integral arrangement of the bracing device in the card body is essential in every case, without limitation to a specific method of production of the card body.

In an advantageous embodiment the bracing device has the form of a bracing frame, the frame members of which are arranged at a distance from edges of the recess in the card body. This embodiment provides a bracing device which acts uniformly over the card cross-section, with the bracing device at the same time being arranged in the plane of the chip module.

However it is equally possible for the bracing device to comprise at least one elongate bracing element which is arranged next to the recess at a distance from an edge of the recess extending in the longitudinal direction of the card. Here again a symmetrically acting bracing device is obtained, with in each case one bracing element arranged on opposite sides of the recess.

In the case of a chip card for contactless access, the object of the invention is achieved by the features of claim 4.

In accordance with the invention, the card body is provided with a bracing device which is arranged at an interval from the chip or chip module and which is arranged overlapping with the chip or chip module or peripheral to the chip or chip module.

This embodiment is based on the principle that, in the case of a chip card for contactless access, in order to maintain functioning reliability in spite of frequently changing dynamic bending stress, it is important to protect the contacting of the coil conductor ends to the connection surfaces of the chip or chip module which is susceptible to bending stress. This is achieved, in accordance with the invention, in that the region of the card body enclosing the contacting zone is braced. In this way the harmful bending stresses are withheld from the contact points. This can be effected either by means of a bracing device which extends across the chip or chip module and thus is situated in a layer overlapping with the chip or chip module, or on the other hand by an arrangement of the bracing device peripheral to the chip or chip module.

Already during the production of the chip card by means of a laminating process, the bracing device according to the invention provides protection for the chip module and the contact points between the chip module and the conductor ends of the coil. Here in particular the stresses occurring during the laminating process are at least partially absorbed by the bracing device.

In accordance with a special embodiment, the bracing device has the form of a bracing frame which borders the chip or chip module and is provided with openings or recesses which facilitate an arrangement of the conductor ends crossing the bracing frame.

In addition to the bracing function, the bracing device can also assume the function of a contact device which electrically conductively connects the conductor ends of the coil to the contact surfaces of the chip or chip module. This further function of the bracing device proves advantageous in particular when the coil is not for example a coil laid on a laminate layer, but is a previously separately wound coil whose conductor ends must be connected to the connection surfaces of the chip or chip module. Here enlarged contact surfaces can be provided by using the bracing device as contact device.

In the above case it proves particularly advantageous for the bracing device to consist of a two-part bracing frame bordering the chip or chip module, each frame member connecting a connection surface of the chip or chip module to a conductor end of the coil.

In the case of a chip card intended both for contact access and contactless access, the object on which the invention is based is achieved by the features of claim 8.

In accordance with the invention, here the coil has the form of a wire coil and the depth of the recess which accommodates the chip module is such that wire ends arranged in the region of the recess comprise a contact flattening formed by the machining process for the formation of the recess.

This embodiment is based on the principle of improving the functioning reliability of such a chip card by making the contacting points between the conductor ends of the coil and the connection surfaces of the chip module more resistant to changing dynamic bending stress. This is achieved in accordance with the invention in that the contacting zones between the conductor ends and the connection surfaces are made as large as possible in area. As the contacting between the connection surfaces of a chip module inserted in a recess of the card body and the conductor ends of a coil is generally effected by means of a conductive adhesive, it is important for the contact surfaces in adhesive contact with one another to be made as large as possible. Additionally, in order to increase the resistance to bending stresses of the adhesive connection, it proves advantageous for the adhesive connection to take place as far as possible in a connection plane parallel to the card surface.

This embodiment utilizes the advantage of the relatively large diameter of the coil wire in the case of a high-frequency coil, which generally is between 100 and 200 $\mu$m. Consequently adequate material thickness is available for the formation of a flattening (in the region of approximately half the wire thickness). For example in a milling process, the penetration depth of the milling tool into the card body can easily be adjusted, with a low accuracy outlay, to a tolerance range of this order of magnitude. In this way the contact surfaces at the conductor ends of the coil which have been enlarged in order to increase the resistance to bending are formed during the milling process which is anyhow performed in order to form the recess.

Although milling is certainly a particularly easily implemented, since conventional, form of machining process, the machining process performed to form a recess with simultaneous formation of the flattening at the conductor ends of the coil is not limited to milling.

The object of improving the functioning reliability of a chip card intended both for contact access and contactless access is further achieved by the features of claim 10.

In accordance with the invention, for this purpose in the card body a stopping device is provided whose coil contact surfaces are contacted with conductor ends of the coil and whose stopping face facing towards the chip module forms a stop for the feed motion in a milling process, such that the stopping face is flush with the base of the recess formed by the milling process.

The above embodiment is based on the principle of providing particularly reliable contacting with a material cross-section adequate for the stresses which occur in the case of a dynamically changing bending load.

Here it has been assumed that, in the production of a conventional chip card facilitating both contact access and contactless access, thus a so-called "hybrid card", for the formation of the card body recess which accommodates the chip module, milling normally takes place up to the conductor ends of the coil conductor paths. As conventional hybrid cards generally employ coils formed by conductor paths on etched polyimide foils, the conductor paths of which anyhow have a thickness only in the range of 15 to 20 $\mu$m, a further weakening of the anyhow small material cross-section of the conductor paths occurs in the above described milling process.

By the use of the abutment device according to the invention, weakening of the coil conductor ends is prevented in all cases, irrespective of the type of coil.

If the abutment device extends laterally beyond the recess, it also serves as bracing device.

The object of the invention relating to a chip card intended both for contact access and contactless access is further achieved by the features of claim 12.

In accordance with the invention, in the card body a contact device is provided, on whose coil contact surfaces conductor ends of the coil are contacted and on whose chip contact surfaces facing the chip module the inner contact surfaces of the chip module are contacted, where the contacting of the conductor ends takes place in a peripheral zone of the chip module. A contact device formed in this way simultaneously serves as bracing device since it extends between the connection surfaces of the chip module and the conductor ends of the coil and thus braces the card body precisely in the bending-sensitive contacting zone.

It proves particularly advantageous for the contact device to comprise a housing section for the accommodation of the chip module and contact arms for the contacting of the conductor ends. The integral construction of the housing section in the contact device allows the previously conventional milling process for the formation of the recess in the card body to be dispensed with. Rather, it is possible to insert the contact device, with or independently of the chip module, in a laminate layer provided with an appropriate window opening. The rear of the contact device and its contact arms can then be contacted on the corresponding side of the laminate layer with the conductor ends of the coil and then covered with a further laminate layer to form the card body. This construction of the chip card consequently facilitates a completely new production process.

It also proves particularly advantageous for the contact arms to have the form of contact springs at their contact ends projecting into the housing section. In this way the chip module can be introduced into the housing section with its inner contact surfaces bearing against the contact ends, against the resistance of the contact springs, until the surface of the chip module with the outer contact surfaces is flush with the surface of the card body or corresponding laminate layer. Here dimensional tolerances between the depth of the housing section and the thickness of the chip module are compensated by the spring action of the contact springs.

The above design of the contact device can be advantageously employed in particular when the chip module is fixed by adhesive in the housing section since, in order to achieve an arrangement of the outer contact surfaces of the chip module flush with the surface of the card body, it is only necessary to apply pressure to the chip module against the spring force of the contact ends until the adhesive has hardened.

Even without an integral design of the housing section, for the contacting of the chip module it is advantageous to provide the contact device with contact springs which facilitate mechanical pressure-contacting and to insert the chip module directly into the recess.

The various embodiments of the invention will be explained in detail in the following making reference to the drawing in which:

FIG. 5 is a plan view of a chip card for contact access and contactless access with a contact flattening formed at conductor ends of a wire coil;

FIG. 6 is a partially enlarged view of the chip card according to FIG. 5;

FIG. 7 is a cross-sectional diagram according to FIG. 6 along the sectional line VII—VII;

Figure 1:
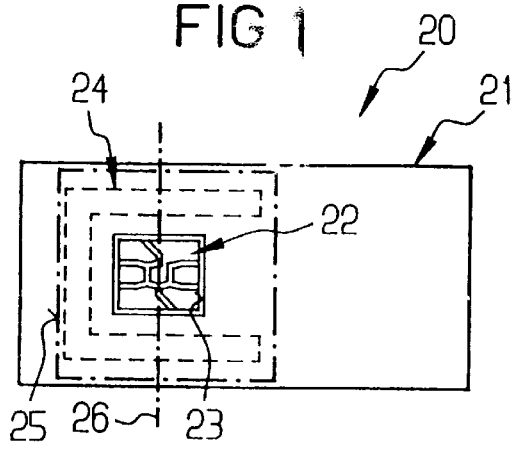
FIG. 1 illustrates a chip card for contact access with a bracing device in a first embodiment.

FIG. 1 illustrates a chip card 20 for contact access to a chip module 22 arranged in a card body 21. The chip module 22 is arranged in a recess 23 introduced into the card body 21 for example by a milling process. Chip cards of the type shown in FIG. 1 are also known for example as so-called "phone cards".

Integrated in the card body 21 is a bracing device 24 which here is of somewhat U-shaped formation and which braces a chip module accommodating zone 25, the size of which exceeds that of the recess 23, in the event of bending about a bending axis 26 indicated by a dash-dotted line in FIG. 1.

Figure 2:
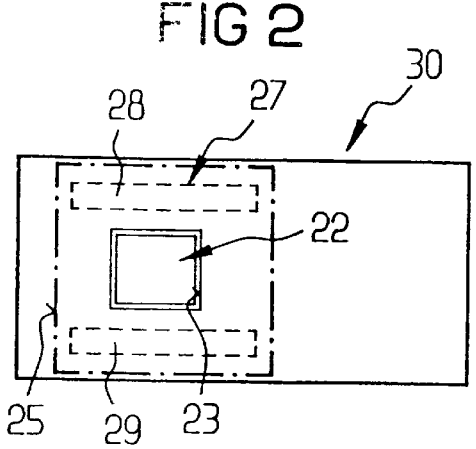
FIG. 2 illustrates a chip card for contact access with a bracing device in a second embodiment.

FIG. 2 illustrates an embodiment of a bracing device 27 modified compared to FIG. 1 and here consisting of two parts comprising two parallel bracing strips 28, 29 extending on both sides of the recess 23 in the longitudinal direction of the card. The bracing strips 28, 29 correspond in their action to the bracing device 24 illustrated in FIG. 1 and brace the corresponding chip accommodating zone 25 of a chip card 30 which otherwise corresponds to the chip card 20 shown in FIG. 1.

In the exemplary embodiments according to FIGS. 1 and 2, both the bracing device 24 and the bracing device 27 formed from the two bracing strips 28, 29 are formed from a thin steel sheet. When the chip cards 20 and 30 are produced by a laminating process, the bracing devices 24, 27 can be integrally arranged in a laminated layer not shown in detail here and integrated as a unit in the form of an intermediate layer in the laminate structure of the chip card 20, 30. In addition to the steel sheet mentioned here as an example material for the bracing devices 24, 27, naturally it is also possible to use other materials; the only requirement is improved rigidity compared to the remainder of the material of the card body.

Figure 3:
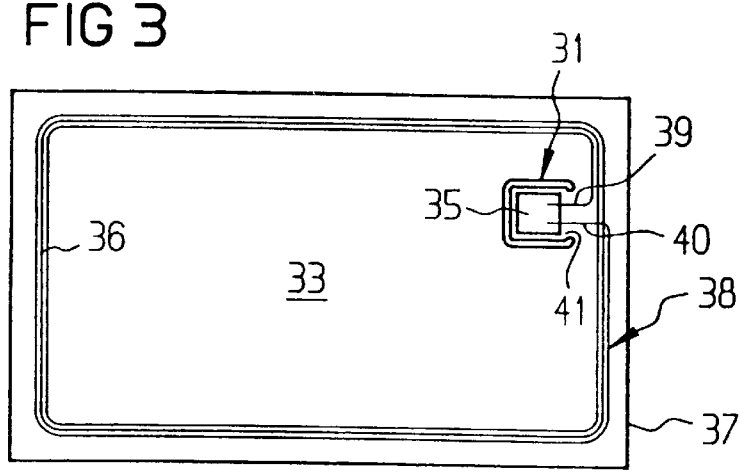
FIG. 3 illustrates a chip card for contactless access with a bracing device in a first embodiment.
Figure 4:
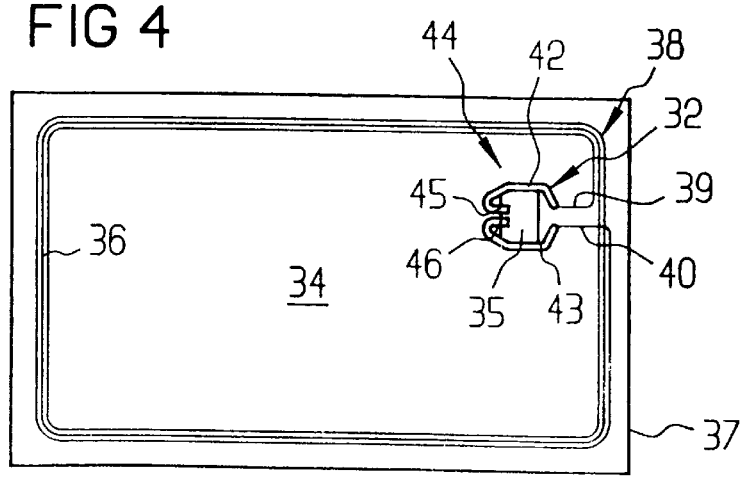
FIG. 4 illustrates a chip card for contactless access with a bracing device in a second embodiment.

FIGS. 3 and 4 illustrate two embodiments of bracing devices 31 and 32 for a chip card 33 (FIG. 3) and 34 (FIG. 4) which facilitate contactless access to a chip 35 of a transponder chip 38 formed from the chip 35 and a coil 36 in a card body 37.

The bracing device 31 is of approximately U-shaped formation and surrounds the chip 35, or a chip module comprising the chip 35, on three sides so that, as shown FIG. 3, the bracing device 31 is arranged peripherally to the chip and enables conductor ends 39, 40 to be fed through from an opening region 41 of the bracing device 31.

The bracing device 32 illustrated in FIG. 4 consists of two parts comprising two strip-shaped bracing elements 42, 43 which at the same time form a contact device 44. Here each bracing element 42, 43 in each case forms an electrical connection between a connection surface 45, 46 of the chip 35 and a conductor end 39, 40 of the coil 36.

FIG. 5 illustrates a chip card 47 which facilitates both contact access and contactless access to a chip module 48. For the contact access to the chip module 48, the chip module comprises outer contact surfaces 51 arranged on its outer contact surface 50 flush with the surface of a card body 49, the precise number and position of which have not been shown in detail here (FIG. 7).

For the contactless access to the chip module 48, the chip module is provided on its inner contact side 52 with inner contact surfaces 53, 54 which allow contacting with wire ends 55, 56 of a wire coil 57 which together with the chip module 48 forms a transponder unit 58.

It can be seen from FIGS. 6 and 7 that for the accommodation of the chip module 48 in the region of the wire ends 55, 56 a recess 59 is provided which in the present case is introduced into the card body 49 by appropriate milling thereof. It can be seen from FIG. 7 that the depth t of the recess 59 is greater than the distance a between a surface 60 of the chip card 47 or card body 49 on the chip module side and the surface of the wire ends 55 and 56. As the wire coil 57 is a laid coil applied by a laying process to a laminate layer 61 and composed of a coil wire 62 with a relatively large wire thickness, for example in the range of 100 to 200 μm, and the wire is circular to oval in cross-section, when the milling of the card body 49 extends into the material of the coil wire 62 (as shown in FIG. 7) a relatively large-area flattening 63 occurs at each wire end 55 and 56. In this way, by means of a conductive adhesive not shown in detail here, a relatively large-area, flat adhesive contact surface is available for the contacting of the inner contact surfaces 53, 54 of the chip module 48 with the wire ends 55, 56, thereby providing a mechanically high load-bearing adhesive connection.

Figure 8:
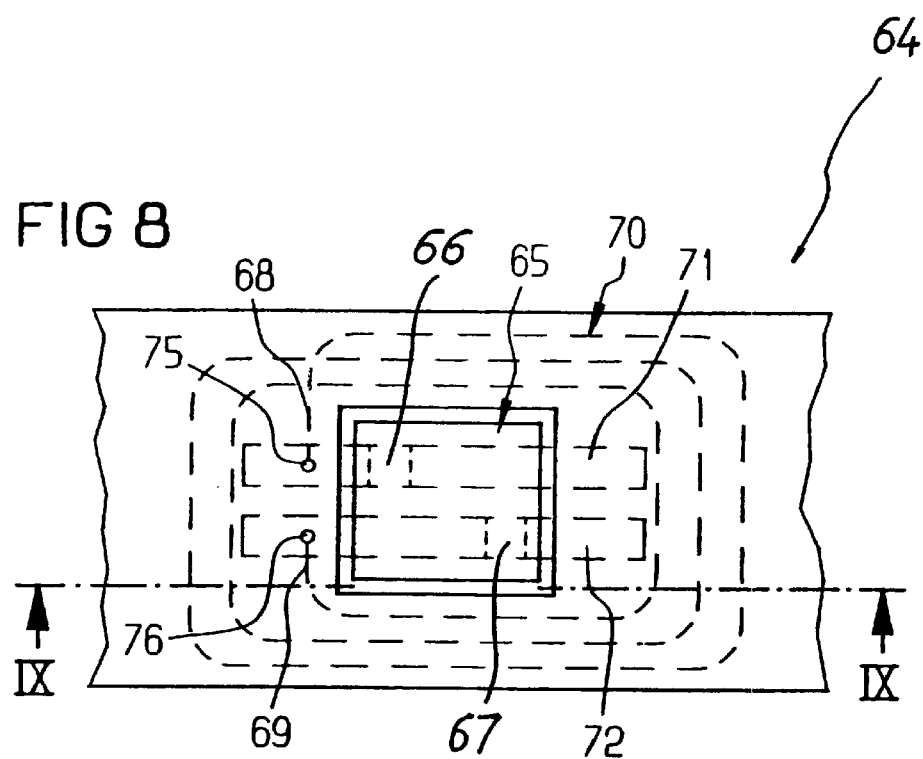
FIG. 8 is a plan view of a chip card for contact access and contactless access with a stopping device.

FIG. 8 illustrates a chip card 64 which, as in the case of the chip card 47 illustrated in FIG. 5, facilitates both contact access and contactless access to a chip module 65. For the contacting of inner connection surfaces 66, 67 of the chip module 65 with conductor ends 68, 69 of a coil 70, the chip card 64 comprises an abutment device 73 here formed from two stopping strips 71, 72 (FIG. 8). The stopping strips 71, 72 are arranged on a carrier foil 74 and each have a contact pin 75, 76. The contact pins 75, 76 penetrate through the carrier foil 74 and on the side opposite the stopping surfaces 77, 78 of the stopping strips 71, 72 are contacted with the conductor ends 68, 69 of the coil 70. The coil 70 can be formed in arbitrary manner, for example also as a coil applied by etching to a polyamide foil.

Figure 9:
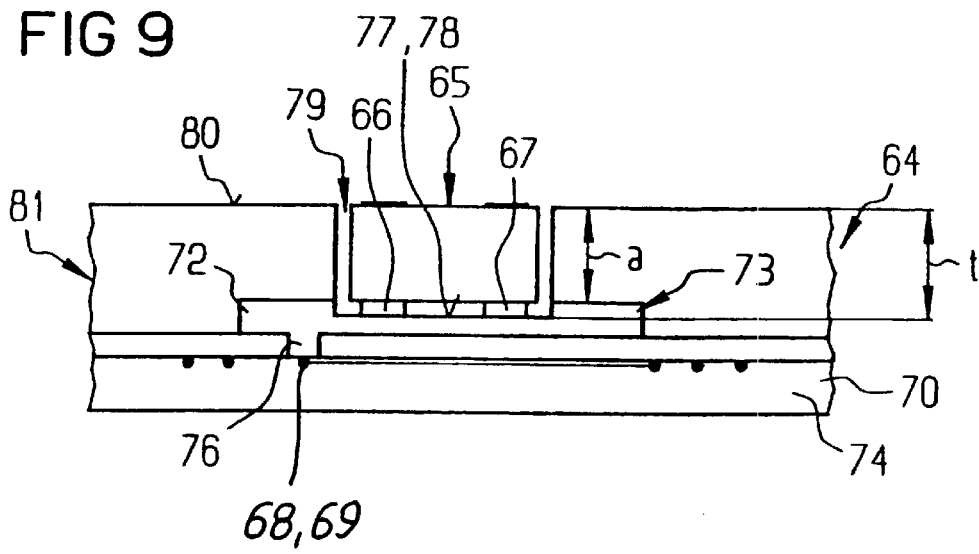
FIG. 9 illustrates the card according to FIG. 8 in a longitudinal section along the sectional line IX-IX.

As can be seen from the longitudinal section in FIG. 9, the chip module 65 is accommodated in a recess 79 whose depth t is greater than the distance a between the surface of the stopping strips 71, 72 and a surface 80, on the chip module side, of a card body 81 accommodating the chip module 65. In the region of the recess 79 the stopping strips 71, 72 are provided with the stopping surfaces 77, 78 which are set back relative to the surface of the stopping strips 71, 72 and are formed during the milling process as a result of the penetration of the milling tool into the material of the stopping strips 71, 72. As, in contrast to the conductor ends 68, 69 of the coil 70 produced for example by etching, the stopping strips 71, 72 have a relatively large material thickness, the milling tool can penetrate into the material of the stopping strips 71, 72 without the risk of excessive material weakening. As the stopping strips 71, 72 provide adequate material thickness, it is even possible to control the advance of the milling tool in force-dependent manner such that the advance is stopped upon the measurement of an increase in force due to the penetration of the milling tool into the material of the stopping strips 71, 72, for example sheet steel. As a result, substantially more complex, direct monitoring of the penetration depth during the milling process can be avoided.

A process for the production of a chip card 82 intended both for contact access and contactless access will be explained in the following making reference to FIGS. 10 to 12. The construction of the chip card 82 can be best explained in the form of the following description of a production possibility.

Figure 10:
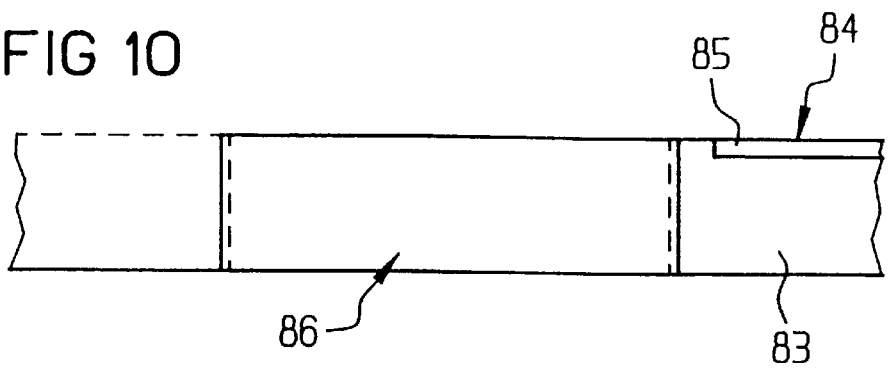
FIGS. 10 to 12 illustrate the production of a chip card with a bracing contact device in three consecutive production steps.

FIG. 10 illustrates a laminate layer 83 which forms the carrier of a coil 84, of which only one conductor end 85 has been illustrated in FIG. 10. The process explained in the following is not limited to a specific coil design. Indeed, suitable coils are those formed by laying a wire conductor on a laminate layer, coils wound in a separate process and then applied to the laminate layer, or coils applied by etching to a carrier foil in which case the carrier foil can then also be used as laminate layer.

Figure 11:
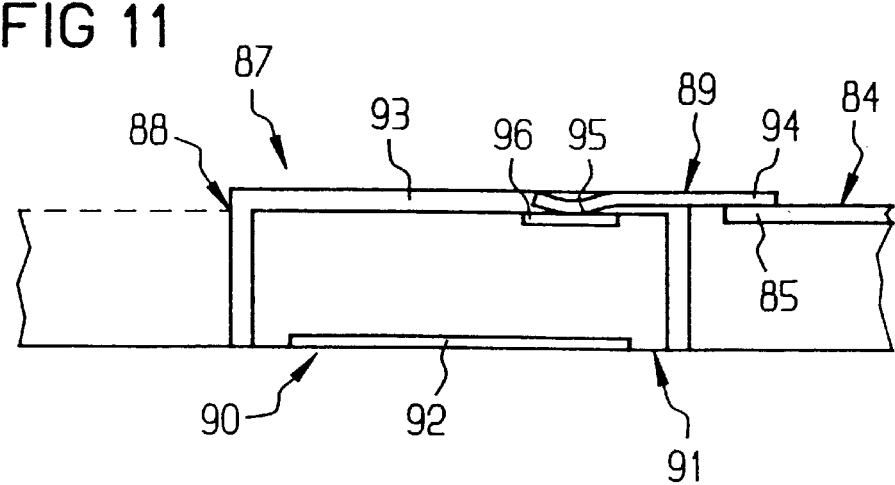
Figure 12:
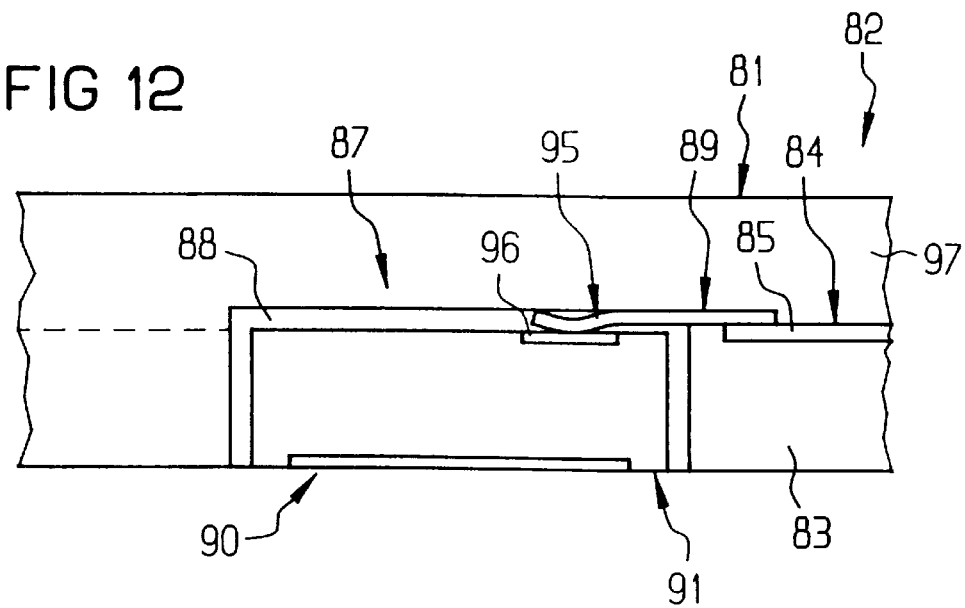

Adjacent to the conductor ends, of which only one conductor end 85 has been illustrated in FIGS. 10 to 12 for representational reasons, a window-like opening 86 is provided in the laminate layer 83.

As shown in FIG. 11, a contact device 87 is inserted from above into the opening 86 of the laminate layer 83, said contact device comprising a housing section 88 with contact arms 89 arranged thereon, of which only one has been shown in FIGS. 11 and 12 for representational reasons. The housing section 88 comprises an opening 90 through which, as shown in FIG. 11, a chip module 91 has already been inserted into the housing section 88. The housing section 88 also remains open after the insertion of the chip module 91 in order to allow contact access to outer contact surfaces 92 of the chip module 91.

The housing section 88, which consists of plastics material in this exemplary embodiment, is provided in its base region 93 with the contact arms 89 such that their outer coil contact ends 94 project from the housing section 88 and their inner contact ends, here in the form of contact springs 95, project into the interior of the housing section 88. Here the contact springs 95 serve to contact inner contact surfaces 96 of the chip module 91.

As can be seen from the diagram in FIG. 11, upon introduction into the opening 86 of the laminate layer 83, the contact arms 89 bear against the conductor ends 85 of the coil 84 and thus permit easy contacting.

As can be seen from FIG. 12, following the contacting of the contact arms 89 with the conductor ends 85 of the coil 84, a further laminate layer 97 is applied to the laminate layer 83 so that the coil 84 is now arranged between two laminate layers 83 and 97 and the contact device 87 is sealed at the rear.

If not already provided, the chip module 91 can now be inserted into the housing section 88 of the contact device 87.

The contacting of the inner contact surfaces 96 of the chip module 91 with the contact springs 95 can take place purely mechanically, thus here with pressure loading, it being possible to secure this contact by adhesively connecting the chip module 91 to the housing section 88. If pressure is applied to the chip module 91 during the hardening of the adhesive, such that the surface of the chip module 91 flushes with the surface of the laminate layer 83, an optimal positioning of the chip module 91 in the housing section 88 is possible without the need to adapt the depth of the housing section interior to the height and thickness of the chip module 91 for this purpose.

What is claimed is:

1. A chip card, comprising:
   a card body;
   a chip arranged in a chip module for contact access to the chip;
   a recess formed in said card body, wherein the chip module is arranged in said recess to define contact surfaces of the chip module arranged at a surface of said card body and in the region of said recess of said card body;
   an integrated bracing device extending in a longitudinal direction of the chip card, said bracing device comprising a bracing frame with frame members arranged separately from said chip and said chip module within said card body at a distance from said chip module, said bracing device being arranged at a distance from edges of said recess.

2. The chip card according to claim 1, wherein the bracing device comprises at least one elongate bracing element which is arranged adjacent to said recess at a distance from an edge of the recess extending in the longitudinal direction of the chip card.

3. The chip card according to claim 1, wherein:
   said chip module holds said chip in said card body and said bracing device is independent of said chip module.

4. A chip card for contactless access to a chip or chip module, the chip card comprising:
   a card body;
   a coil with conductor ends;
   at least one of a chip or chip module arranged together with said coil in said card body to form a transponder unit, said conductor ends of said coil being contacted on connection surfaces of said chip or chip module, said card body comprising a bracing device arranged separately from said chip or said chip module within said card body at a distance from said chip module, said bracing device being overlapping with the chip or chip module or peripheral to the chip or chip module.

5. The chip card according to claim 4, wherein said bracing device comprises a bracing frame which borders the chip or chip module and which is provided with openings or recesses which facilitate an arrangement of said conductor ends crossing the bracing frame.

6. The chip card according to claim 4, wherein:
   said chip and said chip holder are arranged in said card body, said chip module holds said chip in said card body and said bracing device is independent of said chip module.

7. A chip card for contactless access to a chip or chip module, the chip card comprising:
   a card body;
   a coil with conductor ends;
   a chip or chip module with connection surfaces, said ship or chip module being arranged together with said coil in said card body to form a transponder unit;

a bracing device, said card body being provided with said bracing device, said bracing device serving as a contact device for electrically conductively connecting said conductor ends of said coil to said connection surfaces of the chip or chip module, said bracing device being arranged in an area confined by winding of said coil.

8. The chip module according to claim 7, wherein said bracing device comprises a two-part bracing frame bordering said chip or chip module, wherein a frame member in each case connects a connection surface of the chip or chip module to a conductor end of the coil.

9. A chip card, comprising:

a card body;

a coil with conductor ends, said coil being arranged in said card body;

a chip arranged in a chip module, said chip module being arranged in a recess of said card body such that outer contact surfaces of the chip module are arranged at the surface of the card body and inner contact surfaces of the chip module are connected to said conductor ends of said coil to form a transponder unit, the chip card providing contact access and contactless access to said chip, said coil having the form of a wire coil wherein a depth (t) of said recess which accommodates said chip module is such that wire ends arranged in the region of said recess have a contact flattening formed by a machining process for the formation of said recess.

10. The chip card according to claim 9, wherein said recess is formed by a milling process.

11. The chip card according to claim 9, wherein:

said contact flattening significantly reduces a cross section of said wire ends in comparison with another portion of said coil.

12. A chip card, comprising:

a card body;

a coil with conductor ends, said coil being arranged in said card body;

a chip arranged in a chip module, said chip module being arranged in a recess of said card body such that outer contact surfaces of the chip module are arranged at the surface of the card body and inner contact surfaces of the chip module are connected to said conductor ends of said coil form a transponder unit, the chip card providing contact access and contactless access to said chip;

a stopping device provided with coil contact surfaces contacted with said conductor ends of said coil and with a stopping face facing towards the chip module forming a stop for a feed motion in a milling process for forming said recess, said stopping face being flush with a base of said recess as formed by the milling process.

13. The chip card according to claim 12, wherein said stopping device extends laterally beyond said recess and serves as bracing device.

14. A chip card, comprising:

a card body;

a coil with conductor ends, said coil being arranged in said card body;

a chip arranged in a chip module, said chip module being arranged in a recess of said card body such that outer contact surfaces of the chip module are arranged at the surface of the card body and inner contact surfaces of the chip module are connected to said conductor ends of said coil form a transponder unit;

a contact device with a housing section; and a bracing device provided which has an insertion opening towards a surface of the card body, said bracing device accommodating said chip module in a housing section, and said bracing device having coil contact surfaces connected to said conductor ends of said coil, said bracing device having chip contact surfaces facing said chip module contacted with inner contact surfaces of said chip module, contact arms being formed at the periphery of said housing section for the contacting of said conductor ends.

15. The chip card according to claim 14, wherein said contact device comprises contact springs for contacting of said chip module.

16. The chip card according to claim 14, wherein said contact device comprises said housing section which accommodates said chip module.

17. The chip card according to claim 16, wherein said chip module is fixed by adhesive in said housing section.

18. The chip card according to claim 16, wherein said contact arms have contact ends projecting into said housing section, said contact arms being formed as contact springs.

19. The chip card according to claim 18, wherein said chip module is fixed by adhesive in said housing section.

* * * * *